United States Patent [19]

LaPier

[11] Patent Number: 4,685,245
[45] Date of Patent: Aug. 11, 1987

[54] RODENT TRAP

[76] Inventor: Theodore M. LaPier, 78377 Swanson La., Cottage Grove, Oreg. 97424

[21] Appl. No.: 19,933

[22] Filed: Feb. 27, 1987

[51] Int. Cl.⁴ .............................................. A01M 23/30
[52] U.S. Cl. ......................................................... 43/78
[58] Field of Search ........................... 43/58, 77, 78, 85

[56] References Cited

U.S. PATENT DOCUMENTS

| | | | |
|---|---|---|---|
| 109,112 | 11/1870 | Cosolowsky | 43/78 |
| 176,453 | 4/1876 | Wells | 43/78 |
| 573,761 | 12/1896 | Cedzo | 43/78 |
| 613,916 | 11/1898 | Weeden | 43/78 |
| 1,090,031 | 3/1914 | Dawson | 43/78 |
| 1,404,486 | 1/1922 | Shutoff | 43/78 |

*Primary Examiner*—M. Jordan
*Attorney, Agent, or Firm*—John F. Ingman

[57] ABSTRACT

A rodent trap involving an enclosure, having at least one rodent entrance, within which a rodent-trapping member is attached to a shaft which extends through the top of the enclosure. The rodent-trapping member, which may have either a rodent-striking surface or a rodent-enclosing surface, is spring biased from a cocked position high within the enclosure to a released position. The rodent-trapping member is retained in the cocked position by means of a supported retaining pin whose inner end extends into a beveled indentation in the shaft. Release is caused by the movement of the outer end of the retaining pin into alignment with an aperature in the side of the enclosure. Movement of the outer end of the retaining pin is created by pivoting a transversely attached retaining release bar about an adjustable pivot point; such pivoting being generated through mechanical linkage by the movement of a bait holder, or in the alternative, by a hinged floor section. Rotation of a threaded member provides movement of the pivot point, allowing fine adjustment of sensitivity and compensation for wear. Locking means may be provided to retain the rodent trapping member in the released position. A sliding external door may provide bait holder access. A removable entrance extension may guide rodents into the trap from a right angle approach.

16 Claims, 15 Drawing Figures

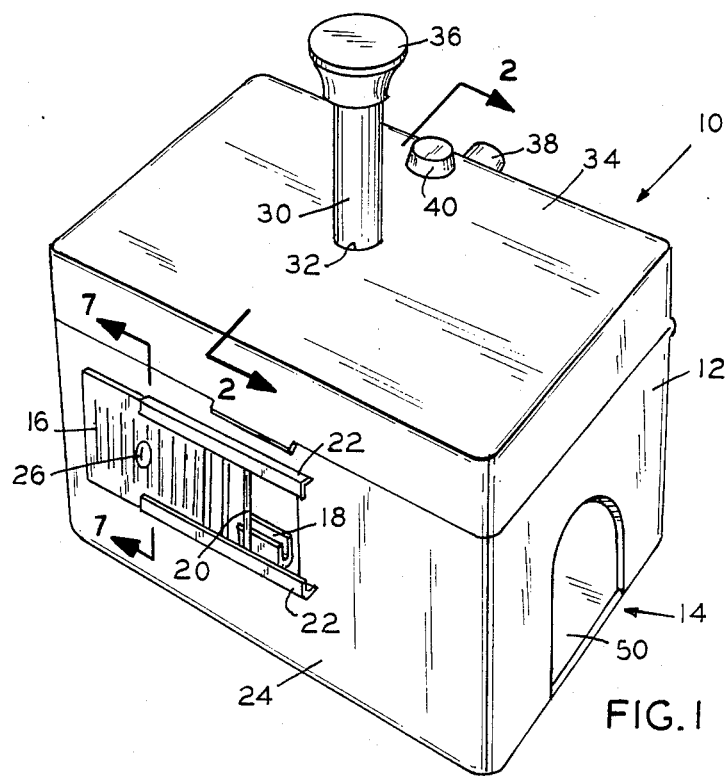
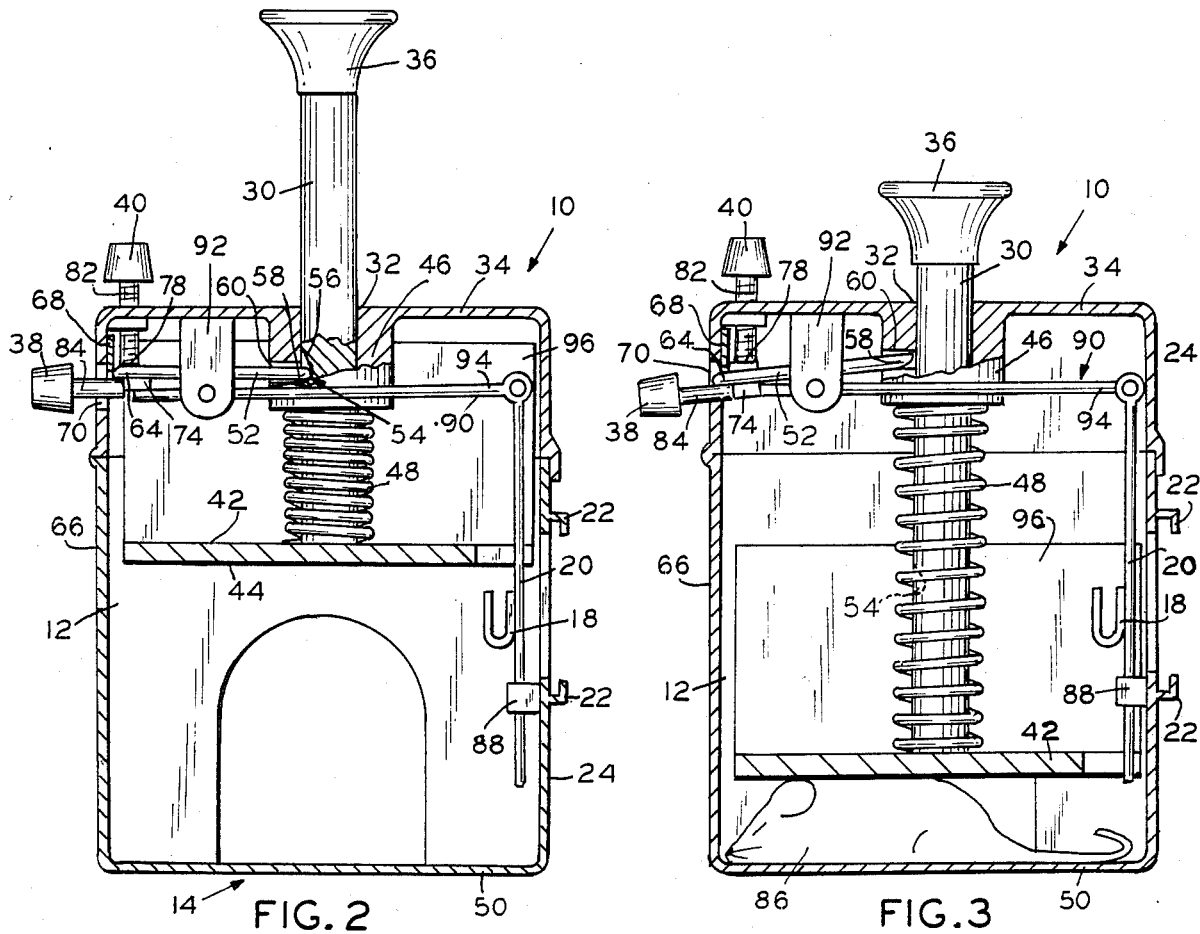

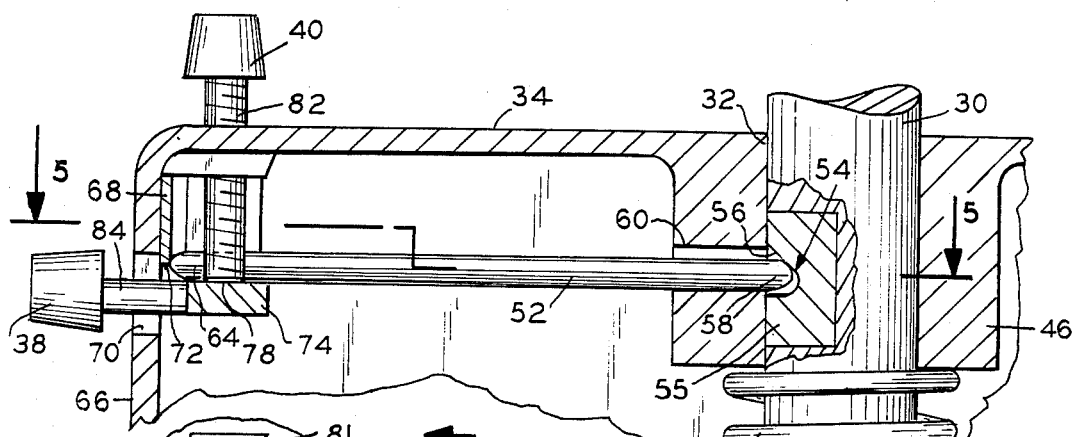
FIG. 4
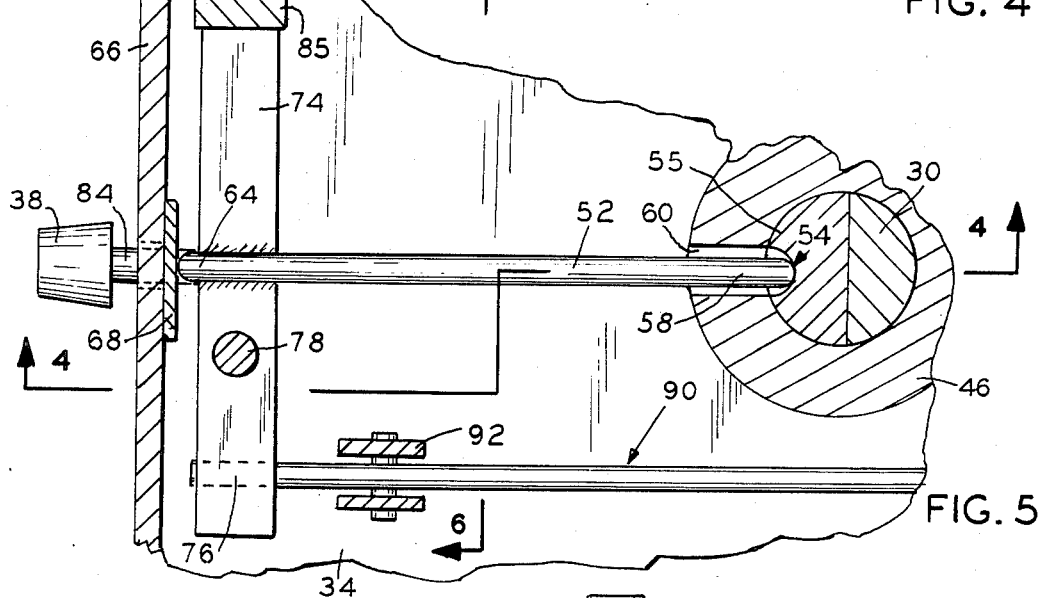
FIG. 5
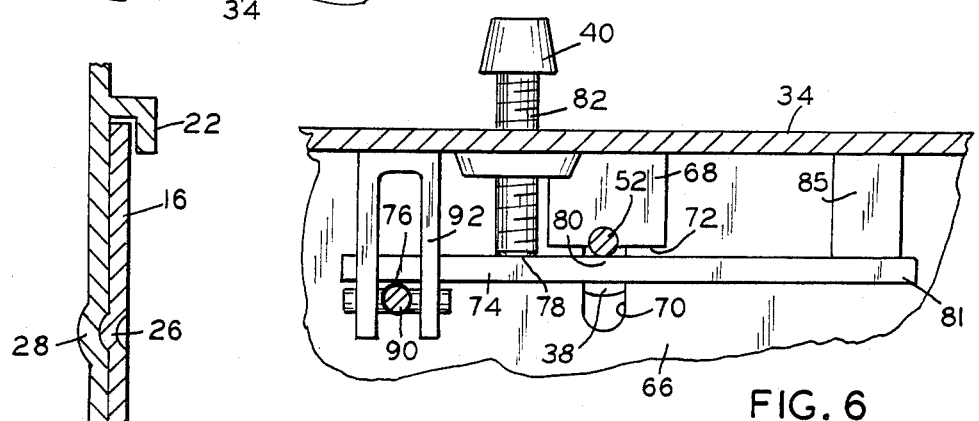
FIG. 7
FIG. 6
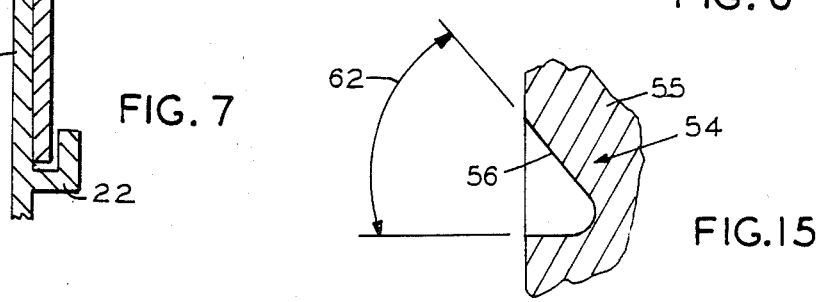
FIG. 15

RODENT TRAP

BACKGROUND OF THE INVENTION

1. Field of the Invention

The present invention generally relates to rodent traps and, more particularly, is concerned with an enclosed rodent trap employing a rodent-trapping surface which has an easily adjustable release sensitivity.

2. Description of the Prior Art

There have been innumerable rodent trap designs through history. The current most available trap is a spring-wire trap which has a number of inherent disadvantages. Such a trap is not attractive and is limited in placement to out of the way areas not subject to accidental bumping, as by children or pets. A current trap may be hazardous to set, and its release sensitivity is fixed, unknown, and affected by wear. In addition, the conventional spring wire trap causes severe localized trauma to the rodent, making the emptying thereof an unpleasant operation.

What is needed is:

a rodent trap which is enclosed and attractive in appearance, and thus suitable for all locations, including drainboard and cabinet use;

a rodent trap which is not hazardous from accidental bumping, as by children and pets, and therefore suitable for all locations (i.e. not severely limited in its placement);

a rodent trap which is easily set or "cocked" without hazard to the setter;

a rodent trap which has readily adjustable release sensitivity;

a rodent trap whose release mechanism is readily adjustable so as to permit compensation for wear thereon;

a rodent trap which kills without causing severe local trauma to the rodent, with resulting release of blood and other residue; and a rodent trap which may be simply emptied by remotely releasing the carcass without having to touch in its vicinity.

SUMMARY OF THE INVENTION

The present invention provides a device for the trapping of rodents which is designed to satisfy the aforementioned needs. The invention embodies a rodent trap which presents an enclosure wherein a spring driven, rodent-trapping member is released, thereby killing or entrapping the offending rodent.

Accordingly, the present invention provides a rodent trap which is comprised of an enclosure, having at least one rodent entrance, within which enclosure exists a rodent trapping member which is connected to a shaft which extends through the top of the enclosure. The rodent trapping member is biased from a cocked position high within the enclosure to a released position close to the floor of the enclosure.

The rodent trapping member and attached shaft are retained in the cocked position by means of a supported retaining pin whose inner end extends into an indentation, beveled at the top, which is formed in the shaft. The release of the rodent trapping member is caused by the movement of the outer end of the retaining pin into alignment with an aperature in the side of the enclosure whereby the retaining pin is freed from the indentation, thereby releasing the rodent trapping member. Movement of the outer end of the retaining pin into alignment with the aperture is created by the pivoting of a retaining release bar, which is attached to the retaining pin, about a pivot point; the pivot-causing movement is generated by the movement of a bait holder, or in an alternative configuration, by the movement of a hinged floor section, which is mechanically connected to the retaining pin release bar.

The pivot point is the lower end of a threaded member, such as a bolt, which is threaded to and extends down from the top of the enclosure. The position of the pivot point thus is movable, so as to be capable of finely adjusting the position of the outer end of the retaining pin with respect to the aperature through which it will exit when the trap is sprung. This adjustment thus provides a capability for fine adjustment of the sensitivity of the release and also permits minute compensation for wear at the outer end of the retaining pin and at the edge of the release aperature.

Locking means may be provided to hold the rodent trapping surface in released position, thereby providing additional means for keeping the rodent within the trap. The locking means may comprise a serrated portion of the shaft combined with an externally extending and releasable spring biased rod interacting therewith.

Bait holder access means may be provided adjacent to bait holders within the trap; a sliding external door facilitates such access.

A removable entrance extension which fit over the end of the enclosure entrance may be used to guide rodents from a right angle approach to the enclosure.

The rodent-trapping member may have either a rodent-striking surface for killing the rodent, or a rodent-enclosing surface which blocks off the rodent entrance for live capture. When a rodent-striking surface is employed, the striking surface as well as the floor of the enclosure may contain rodent-gripping protrusions to assist in the retention of the rodent within the trap.

BRIEF DESCRIPTION OF THE DRAWINGS

FIG. 1 illustrates a perspective view of the instant rodent trap invention.

FIG. 2 shows a cross section of the rodent trap as viewed at 2—2 of FIG. 1, wherein the trap is in a cocked position.

FIG. 3 shows a cross section of the rodent trap as viewed in FIG. 2, but illustrating the trap in released position.

FIG. 4 illustrates an enlarged side sectional view of a portion of the release mechanism, as shown in FIG. 2 and at 4—4 of FIG. 5.

FIG. 5 shows an enlarged top sectional view of the release mechanism as seen at 5—5 of FIG. 4.

FIG. 6 shows an enlarged side sectional view of the release mechanism as seen at 6—6 of FIG. 5.

FIG. 7 shows an enlarged sectional view of a sliding bait access door, as seen at 7—7 of FIG. 1, and in FIGS. 2 and 3.

FIG. 15 illustrates an enlarged cross sectional view of the shaft indentation, showing the bevel of its upper surface.

DESCRIPTION OF THE PREFERRED EMBODIMENT

Figure 8:
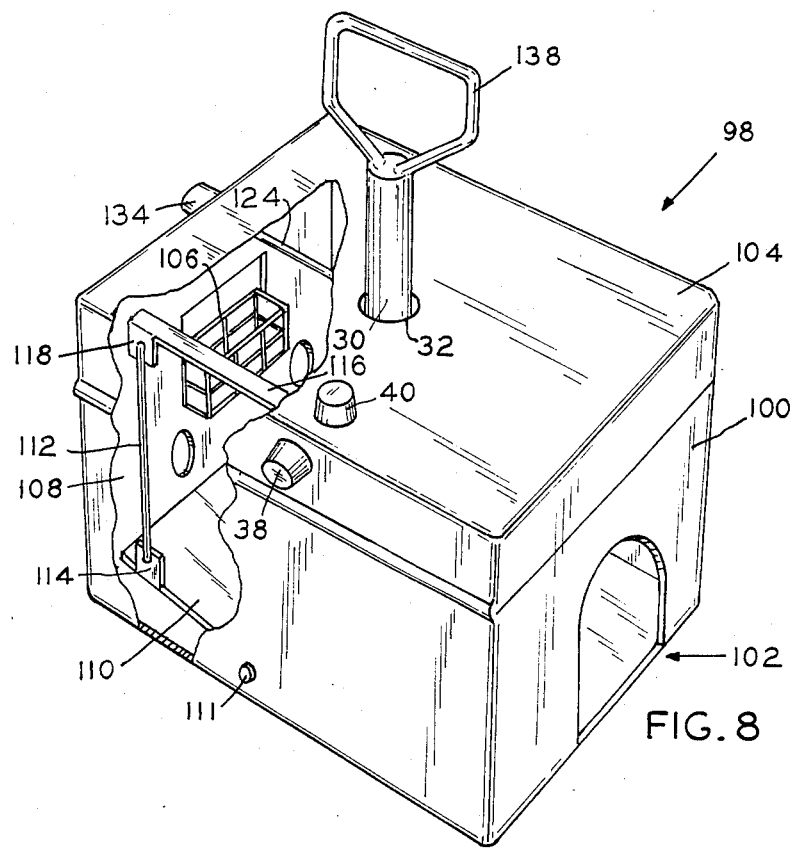
FIG. 8 illustrates a perspective view, with a cut-away section, of an alternate configuration of the rodent trap using floor movement triggering.

Referring now to the drawings, and more particularly to FIG. 1, there is shown a perspective view of a preferred embodiment of the rodent trap 10. An enclosure 12 is provided with a rodent entrance 14 through which the unwanted rodent may gain entrance to the inside of the enclosure 12. FIG. 1 shows a sliding bait access door 16 which provides easy access to a bait holder 18 which is attached to a vertical rod 20. The door 16 slides in door frames 22 which are mounted on enclosure side 24. A dimple 26 in the sliding door 16 interacts with a corresponding dimple 28 in enclosure side 24 to lock the door in open position. This is better seen in the cross section view at FIG. 7. A similar dimple (not shown) in enclosure side 24 serves to lock the door in a closed position. FIG. 1 also shows a shaft 30 extending through an aperature 32 formed in the top 34 of the enclosure 12. On top of the shaft 30, for ease in grasping and pulling, a knob 36 has been attached, preferably by common threaded attachment. Two additional knobs, 38 and 40 are also in view in FIG. 1; their function is better described in conjunction with subsequent figures.

FIG. 2 and FIG. 3 are cross sectional views which present the rodent trap 10 in its two operational modes, cocked and released, respectively. In FIG. 2, rodent-trapping member 42, shown as having a rodent-striking surface 44, is connected to the lower end of the shaft 30. A collar 46 is attached to, or formed as a part thereof, the top 34 of the enclosure 12, through which the aperature 32 also is formed and through which shaft 30 extends and slides. Between the rodent-trapping member 42 and the lower side of collar 46 is a compression spring 48 which is located concentrically about shaft 30. Spring 48 is shown in FIG. 2 to be in compression, pressuring the rodent-trapping member 42, with its rodent-striking surface 44, and the attached shaft 30, towards the floor 50 of the enclosure 12.

The rodent-trapping member 42 and attached shaft 30 are restrained in the cocked position by the presence of a retaining pin 52 which, in the cocked postion, is found inserted into an indentation 54 formed in shaft 30. If the shaft 30 is made of a soft material, such as plastic, the indentation 54 may be formed in an insert 55, as seen in FIG. 4 and 5, made of harder material such as a metal, which insert 55 is secured in an appropriately shaped notch in shaft 30. The upper surface 56 of the indentation 54 presses downward against the inner end 58 of the retaining pin 52, thereby precluding downward movement of shaft 30 and the attached rodent-trapping member 42. This is best seen in FIG. 4.

The collar 46 has formed therein an aperature 60 through which the retaining pin 52 extends. The collar 46 thereby provides the support for the retaining pin 52, restraining the retaining pin 52 from transverse movement, particularly in the downward direction against the exertion of pressure through the indentation 54 by the spring 48. The collar 46 thus supports the shaft 30 and rodent-trapping member 42 while in the cocked position.

In addition to creating downward pressure on the inner end 58 of the retaining pin 52, the interaction with the upper surface 56 of the indentation 54 also applies outward pressure on the retaining pin 52. Such outward pressure is enhanced by the beveling of the upper surface 56 of the indentation 54. A bevel angle 62, as shown in FIG. 15, of fifty one (51) degrees with a tolerance of plus or minus three (3) degrees has been found to work well, and is preferred, although other beveling angles may also be satisfactory.

Outward movement of the outer end 64 of retaining pin 52 is restrained, in the cocked position, by the abutment of outer end 64 against the side 66 of enclosure 12. Since enclosure 12 may be made of plastic or other relatively soft material, the preferred embodiment utilizes a harder surface on side 66 of enclosure 12, shown as a wear plate 68, for the outer end 64 of retaining pin 52 to press against.

As is best illustrated in FIG. 4, an aperature 70 is formed in the side 66 of enclosure 12 to permit, when desired, the outer end 64 of retaining pin 52 to exit the enclosure 12, thus removing its inner end 58 from the indentation 54 in the shaft 30, allowing the trap to release. Such aperature 70 is located immediately adjacent to the lower edge 72 of wear plate 68. Thus, in order to release the rodent trap 10, only a small downward movement of outer end 64 of retaining pin 52, past lower edge 72 of wear plate 68 is required.

Movement of the outer end 64 of the retaining pin 52 is accomplished, in the preferred embodiment, by a retaining pin release bar 74 which is attached transversely to the retaining pin 52 at a position inward of the outer end 64. The retaining pin release bar 68 serves the function of a lever, which, when rotated about a fulcrum or pivot point, will provide appropriate movement. Here, as best seen in FIG. 6, upward movement at location 76 on the release bar 74 will pivot the release bar 74 about a pivot point location 78, and thus lower the location 80 on release bar 74, and the outer end 64 of retaining pin 52 attached thereat.

The amount of such downward movement of the outer end 64 of retaining pin 52 needed to release the trap will depend upon the proximity of the outer end 64 of retaining pin 52 to the lower edge 72 of wear plate 68. A fine sensitivity adjustment is developed whereby the pivot point 78 can be minutely raised or lowered. The pivot point 78 is located at the lower end of a threaded member 82, which threaded member 82 extends through, and is conventionally threaded to, the top 34 of the enclosure 12. The knob 40 is attached to the threaded member 82 to facilitate its rotation. By rotating the threaded member 82, the pivot point 78 can be raised or lowered, thus affecting the position of the outer end 64 of retaining pin 50, and thus the sensitivity of the release. Such fine adjustment capability also provides the user to adjust for any wear on the wear plate 68, its lower edge 72, or the outer end 64 of the retaining pin 52 due to repetitive usage.

The knob 38 is directly attached, by means of a short rod 84, to the release bar 74, thereby providing a means, outside of the enclosure 12, whereby the retaining pin 52 can be manually pushed, so as to position its inner end 58 within indentation 54, and lifted, so that its outer end 64 is located against the wear plate 68, thus resetting the release mechanism for subsequent release. A member 85, formed on and extending down from the top 34 of enclosure 12 limits and levels the upward movement of end 81 of the retaining pin release bar 74 at resetting.

FIG. 3 illustrates the rodent trap 10 in released position whereby the retaining pin 52 has moved from indentation 54 in shaft 30, and outward through aperature 70, thereby allowing spring 48 to expand and propel the rodent-trapping member 42 with its rodent-striking surface 44 down upon the unwanted rodent 86.

As noted above, in the instant configuration, upward movement of location 76 is required to release the trap. Such movement may be obtained by a variety of mechanical linkages connected to a triggering mechanism. In the configuration of rodent trap 10 illustrated in FIG. 1 though 6, a bait holder 18 is suspended within the enclosure 12 from a vertical rod 20. The vertical rod 20 is restrained near its lower end by slide 88 attached to or formed in the side 24 of the enclosure 12, as shown. The upper end of the vertical rod 20 is hingedly connected to horizontal rod 90. The horizontal rod 90 is pivoted at a yoke arrangement 92, whose location will determine the mechanical leverage, as is commonly appreciated. Thus, downward movement of the bait holder 18 will cause downward movement of vertical rod 20, downward movement of the bait-side portion 94 of rod 80 and hence, through the pivot at the yoke arrangement 92, upward movement at the end of the horizontal rod 90 at location 76 of the release bar 74.

Downward movement of the bait holder 18 is achieved by efforts of the rodent, particularly downward grabbing movements of its front paws. For this reason, the bait holder 18 must be located high in the open space provided in the enclosure 12 when the trap is in the cocked position.

A vertical wall section 96 may be attached to or formed with rodent trapping member 42 at its edge or edges which are adjacent to an enclosure entrance 14, so as to extend upwards. Such vertical wall section 96 will prevent access to the upper part of the enclosure 12 while the rodent trap 10 is in a released position.

The above configuration, wherein movement of a bait holder 18 is the triggering mechanism, is generally preferred for smaller rodents, such as mice, although such configuration is clearly operational for larger rodents such as rats.

However, an alternative configuration is preferred for the larger rodents, to include ground hogs and the like. This rodent trap alternative configuration 98 is illustrated in FIG. 8 though 14. In describing the rodent trap alternative configuration 98, where appropriate, reference numbers used in the description for the rodent trap 10 are continued in use.

Figure 10:
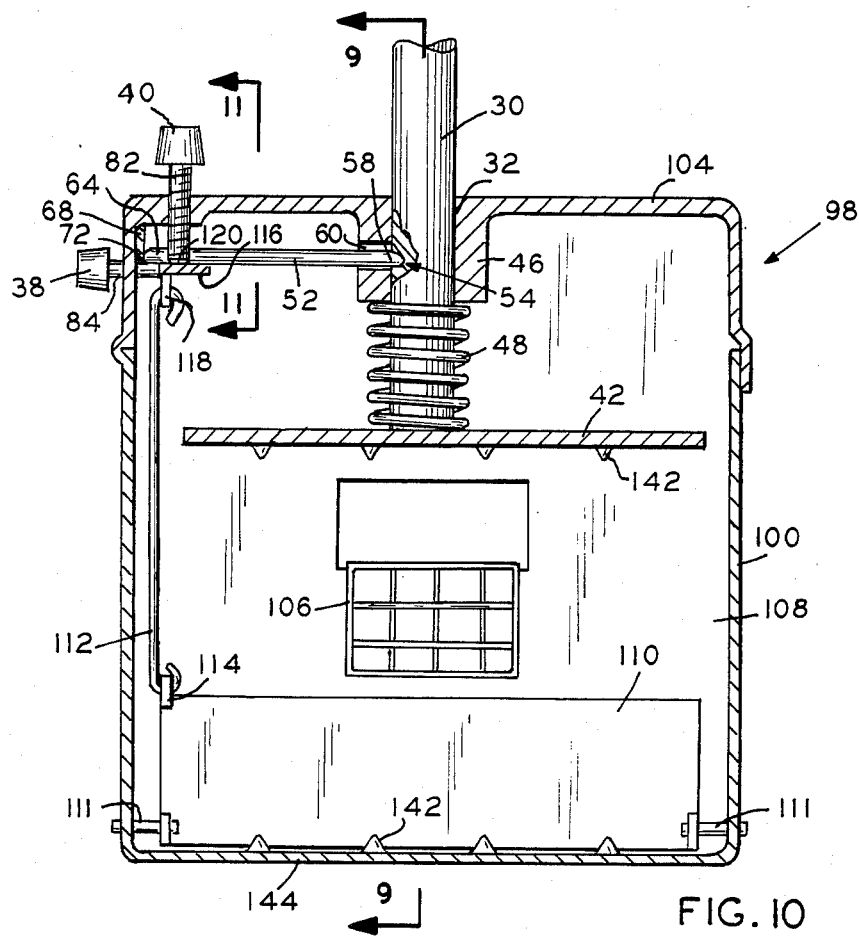
FIG. 10 shows a cross section view of the rodent trap of FIG. 8, as viewed at 10—10 of FIG. 9.
Figure 11:
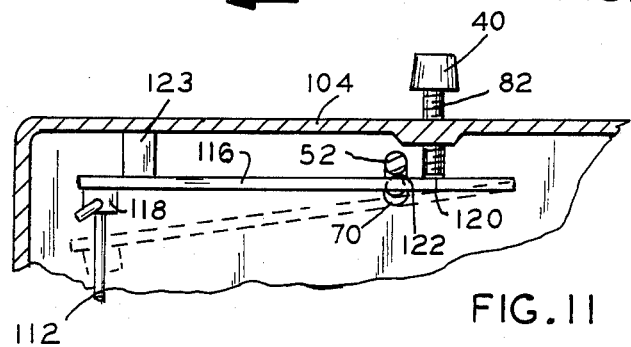
FIG. 11 illustrates an enlargment of the retaining pin release bar as seen at 11—11 of FIG. 10.

FIG. 8 shows a perspective view of the rodent trap alternative configuration 98, which includes an enclosure 100 with a single rodent entrance 102, a shaft 30 extending through an aperature 32 in the top 104 of the enclosure 100, and through the cut away section of the drawing, one can observe a bait holder 106 attached to the end wall 108 opposite to the entrance 102. As better seen in FIG. 9, a hinged floor section 110, which is pivotally attached to the enclosure 100 by hinge members 111, is held at an inclined position by means of a vertical rod 112 whose lower end is attached to the hinged floor section 110 at location 114 and whose upper end is attached to retaining pin release bar 116 at its end 118. This mechanical coupling of hinged floor section 110 to retaining pin release bar 118 is also shown in FIG. 10. FIG. 11 illustrates the manner of release which is similar to that of the rodent trap 10. In the alternative configuration rodent trap 98, the weight of the rodent on the hinged floor section 110 pulls the vertical rod 112 downward, thus pulling the end 118 of the retaining pin release bar 116 downwards also. As seen in FIG. 11, the retaining pin release bar 116 is rotated about the pivot point location 120, thereby lowering release bar location 122, and also lowering the outer end 64 of the retaining pin 52, which is attached to the retaining pin release bar 116 at location 122. As in rodent trap 10, the retaining pin 52 is, in the cocked position, inserted into an indentation 54 within shaft 30. Lowering of the outer end 64 of the retaining pin 52 past the lower edge 72 of wear plate 68 allows the outer end 64 of the retaining pin 52 to exit the aperature 70, thus releasing the spring propelled rodent-striking surface 44 onto the rodent. The pivot point location 120, as in the rodent trap 10, is finely adjustable by the rotation of the threaded member 82 which extends through the top 104 of the enclosure 100. Knob 38 is used to push and lift reatining pin release bar 116 to reset the rodent trap 98 in the same manner as with rodent trap 10. Member 123, formed on and extending downward from top 104 of enclosure 100, limits and levels the upward movement at end 118 of the retaining pin release bar 116 at resetting.

The alternative configuration rodent trap 98 thus differs from the rodent trap 10 primarily by the method of triggering release, that is, movement of a hinged floor section 110 as opposed to movement of a bait holder 18, and the alternative mechanical linkage necessary to pivot the retaining pin release bar 74 or 116, so as to lower the outer end 64 of the retaining pin 52 into alignment with the aperature 70.

Certain other features of the instant invention are also illustrated with the alternative configuration rodent trap 98, primarily because they are features which would be preferred with the trap to be generally used for larger rodents. However, these features also have potential application with the smaller rodent oriented trap 10, and should not be restricted to the alternative configuration 98.

Figure 9:
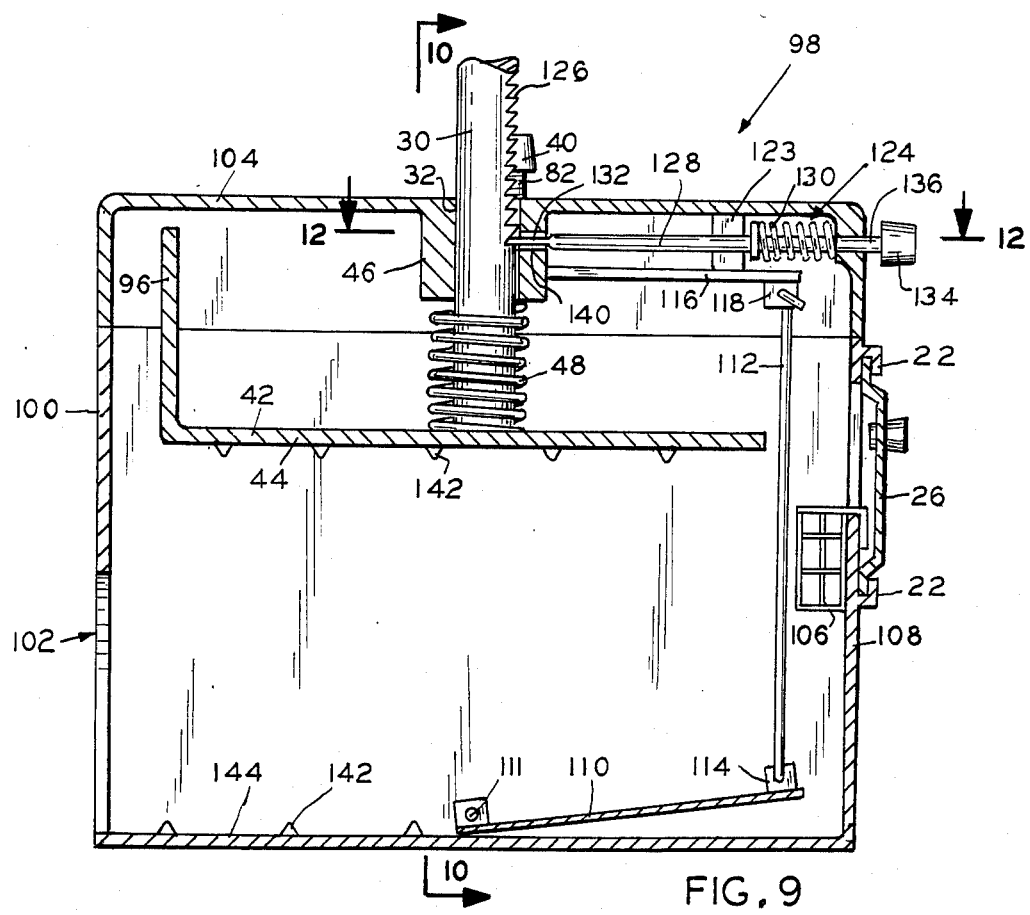
FIG. 9 shows a side cross section view of the rodent trap of FIG. 8, as viewed at 9—9 of FIG. 10.
Figure 12:
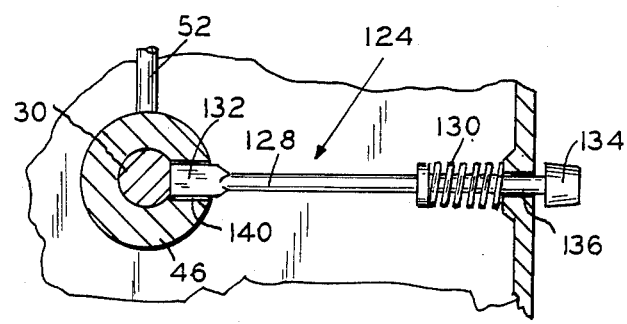
FIG. 12 shows an enlarged view of the rodent trapping member locking means as seen at 12—12 of FIG. 9.

In FIG. 9, a rodent trapping member locking means 124 is shown which is designed to hold the rodent-trapping member 42 in its lower or released position. The locking means is comprised of multiple transverse serrations 126 formed along one side of the the shaft 30, which serrations 126 interact with a rod 128 biased inwards by spring 130. The inner end 132 of the rod 128 may be flattened in order to provide greater interaction surface with the serrations 126. Pulling outwards on a knob 134 attached to the outer end 136 of rod 128 pulls the inner end 132 of the rod 128 from between the serrations 136, thus releasing the locking action, and allowing the shaft 30 to be raised by its handle 138 or other knob. The inner end 132 of the rod 128 is supported by an appropriately shaped aperature 140 formed in the collar 46. The locking mechanism is illustrated in FIG. 9 and FIG. 12.

Multiple rodent gripping protrusions 142 may be formed on or affixed to the rodent-striking surface 44 and to the floor 98 of the enclosure 100 to assist in preventing a trapped rodent from exiting the trap 98.

Figure 13:
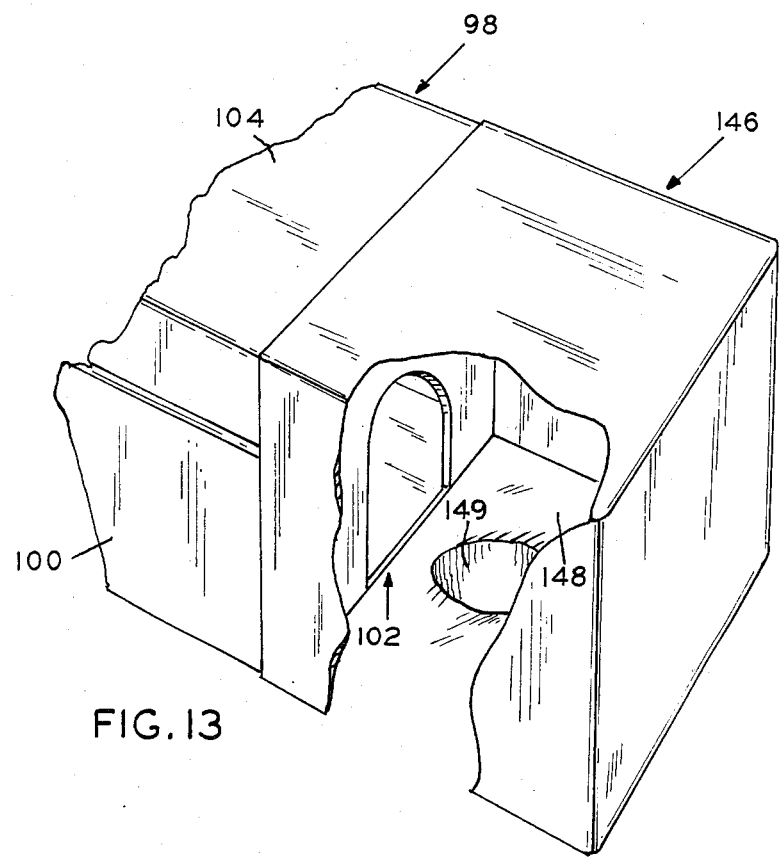
FIG. 13 illustrates the removable entrance extension, as attached to the end of a rodent trap.

A removable entrance extension 146 which is attached to the trap 98 at the enclosure entrance 102 may be used. As illustrated in FIG. 13, such entrance extension 146 may be used to guide the rodent, from a right angle approach, to the enclosure entrance 102. Capable of being oriented so that the extension entrance 148 points up, down, or to either side, the entrance extension 146 will find valuable use when the trap 98 is placed next to a hole in the wall (not shown), as for rats, or over a hole in the ground 149, as for gophers.

Figure 14:
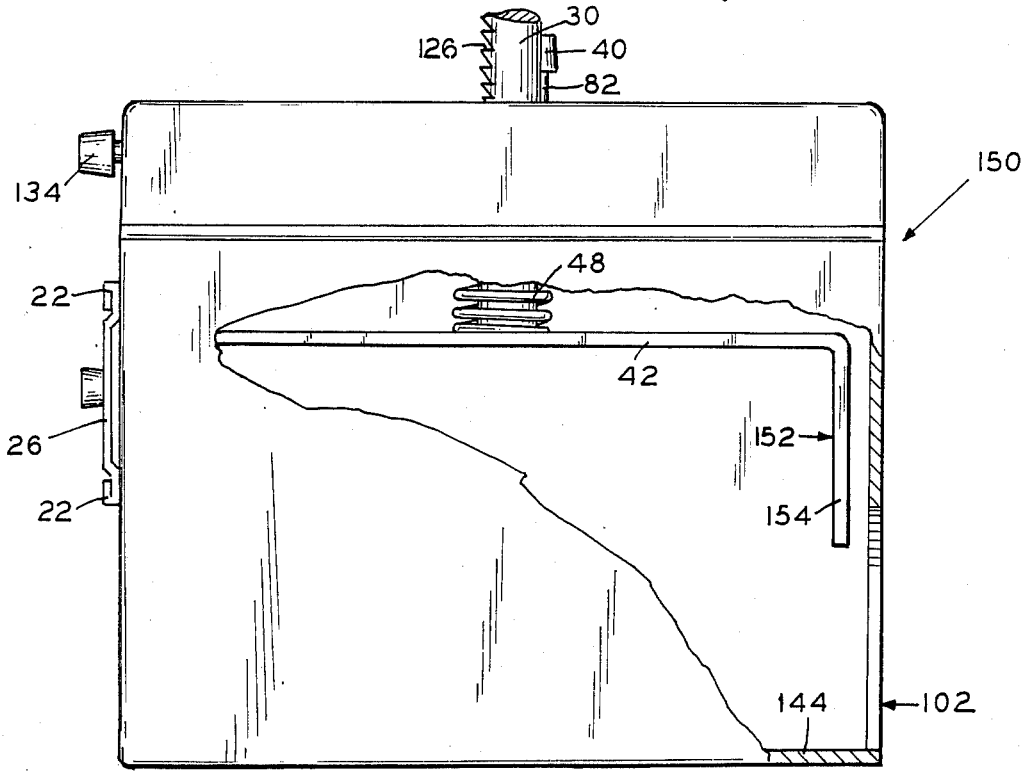
FIG. 14 illustrates the rodent trapping means with an alternative rodent-enclosing surface, which when released covers the enclosure entrance.

Finally, due to the reluctance of some persons to utilize a killing trap, a live trap capability is provided. In the live trap configuration 150, as is illustrated in FIG. 14, the rodent-striking surface 44 of the rodent-trapping member 42 has been replaced with a rodent-enclosing surface 152. Such rodent-enclosing surface 152 is characterized by a wall member 154 attached to or formed with and extending downwards on the end of the rodent-trapping member 42 which is adjacent to the enclosure entrance 102. The wall member 154 serves two purposes, in that it prevents the rodent trapping member 42 from continuing its movement toward the floor 144 of the trap 98, thus providing a safe clearance space for the trapped rodent when the trap has been released, while it also provides an unpenetrable wall which prevents the rodent from exiting through the enclosire entrance 102. The operating mechanism for the live trap configuration 150 remains the same as described in the two alternative configurations of rodent trap 10 and 98.

It is thought that the rodent traps of the present invention and their many attendant advantages will be understood from the foregoing description and that it will be apparent that various changes may be made in form, construction and arrangement of the parts thereof without departing from the spirit and scope of the invention or sacrificing all of its material advantages, the forms hereinbefore stated being merely exemplary embodiments thereof.

I claim:
1. A rodent trap, comprising:
   a. an enclosure, having at least one rodent entrance, a first aperature and a second aperature, formed therein;
   b. a rodent-trapping member;
   c. a shaft, attached perpendicularly to said rodent trapping member and extending therefrom through said first aperature formed in said enclosure;
   d. said rodent-trapping member and attached shaft having two positions within said enclosure: a cocked position and a released position, wherein said rodent-trapping member and attached shaft are biased to travel from said cocked position to said released position unless retained in said cocked position;
   e. cocked position retaining means, which comprise:
      (1) an indentation formed in said shaft;
      (2) a retaining pin, having an outer end and an inner end, extending from its said inner end within said indentation in said shaft when in said cocked position to its said outer end in the proximity of the said second aperature formed in said enclosure; and
      (3) retaining pin supporting means, which means provide transverse support while allowing longitudinal movement of said retaining pin;
   f. retaining pin releasing means, which means comprise:
      (1) a retaining pin release bar, attached transversely to said retaining pin;
      (2) a retaining pin release bar pivot means, which pivot means is located so as to provide a pivot point for said retaining pin release bar to pivot about, thereby causing movement of said outer end of said retaining pin;
      (3) a release triggering means;
      (4) mechanical linkage connecting said release triggering means to said retaining pin release bar, said mechanical linkage translating movement of said triggering means to said retaining pin release bar, which, in turn, through pivoting about said retaining pin release bar pivot means, biases said retaining pin into alignment with said second aperature of said enclosure so as to permit said outer end of the said retaining pin to exit through said second aperature of said enclosure; said exiting of said outer end through said second aperature withdraws said inner end of said retaining pin from within said indentation of said shaft, thereby releasing said shaft and rodent-trapping member onto said rodent.

2. A rodent trap, as recited in claim 1, wherein the said retaining pin supporting means comprises a collar, encircling said shaft and attached to said enclosure at said first aperature, with said first aperature also extending through said collar; said collar having an additional aperature, termed the second collar aperature, formed therein for support and alignment of said retaining pin; said second collar aperature being transverse to said first aperature and being aligned with said indentation formed in said shaft.

3. A rodent trap, as recited in claim 1, wherein, to provide said bias for said rodent-trapping member and attached shaft to travel from said cocked position to said released position, there is a rodent-trapping member propelling means, which propelling means comprises a compression spring concentrically aligned with and encircling said shaft between said rodent-trapping member and said enclosure at said first aperature, the said spring being in compressed configuration when said rodent-trapping member and shaft are in said cocked position so as to, when released, propel said rodent-trapping member towards said released position.

4. A rodent trap, as recited in claim 1, wherein the said retaining pin release bar pivot means includes a threaded member, threaded through a third aperature in said enclosure and having a lower end within said enclosure, the position of said lower end of said threaded member being adjustable through rotation so as to move the pivot point, located at said lower end of said threaded member, with relation to said second aperature through which the outer end of said retaining pin exits upon release; said pivot point thus being adjustable so as to vary the location of said outer end of said retaining pin and thus provide adjustability in sensitivity and wear compensation.

5. A rodent trap, as recited in claim 1, wherein the said release triggering means includes a bait holder attached to said mechanical linkage so that when said bait holder is moved, the said retaining pin release bar rotates about the said retaining pin release bar pivot means to move said outer end of the said retaining pin into alignment with the said second aperature.

6. A rodent trap, as recited in claim 5, where, in addition, there is a baiting aperature formed in the side of said enclosure adjacent to the said bait holder; said bait aperature having a movable covering.

7. A rodent trap, as recited in claim 1, wherein the said release triggering means includes a movable inclined floor section whose movement by said rodent, through the said mechanical linkage, will rotate said retaining pin release bar about said retaining pin release bar pivot means to move said outer end of said retaining pin into alignment with said second aperature.

8. A rodent trap, as recited in claim 7, where, in addition, a bait holder is located inside the said enclosure at the end of said enclosure opposing the said rodent entrance; and there is a bait aperature with movable covering located in said enclosure proximate to the said bait holder.

9. A rodent trap, as recited in claim 1, where, in addition, there are rodent-trapping member locking means applied when the rodent-trapping surface is in said released position.

10. A rodent trap, as recited in claim 9, wherein the said rodent-trapping member locking means includes:
 a. multiple transverse serrations formed in series longitudinally along the said shaft;
 b. a spring-biased locking rod, with a serration-interacting end, extending from said serrations on said shaft out through a locking rod aperature in said enclosure; and
 c. a spring-biased locking rod supporting means, so formed as to support the said spring-biased locking rod, and align the said spring-biased locking rod with the said serrations formed in said shaft.

11. A rodent trap, as recited in claim 1, wherein, in addition, there is a removable entrance extension member which fits over said rodent entrance so as to provide an access guide for rodents; said entrance extension member having an entrance for rodents at right angle orientation to the said rodent entrance of said enclosure and an exit leading into said rodent entrance of said enclosure; said entrance extension being removably rotatable to provide access guidance from any of four right angle directions to said rodent entrance.

12. A rodent trap, as recited in claim 1, wherein the said indentation formed in said shaft is formed in a separate insert, which insert is placed into an appropriate notch formed in said shaft for said insert.

13. A rodent trap, as recited in claim 1, wherein the said indentation has an upper surface which is angled at thirty nine degrees, plus or minus three degrees, with the longitudinal axis of said shaft.

14. A rodent trap, as recited in claim 1, wherein the rodent-trapping member is a rodent-striking surface.

15. A rodent trap, as recited in claim 14, wherein multiple rodent-gripping knobs extend from said rodent-striking surface and from the floor of said enclosure, so as to aid in the retention of said rodent within said enclosure.

16. A rodent trap, as recited in claim 1, wherein the said rodent trapping member is a rodent-enclosing surface, having, when in said released position, a downwardly extending wall member which covers the said rodent entrance so as to preclude exit by the rodent.

* * * * *